(12) United States Patent
Rieck et al.

(10) Patent No.: US 8,944,032 B2
(45) Date of Patent: Feb. 3, 2015

(54) DIESEL FUEL FEED SYSTEM

(75) Inventors: Steven T Rieck, Cambridge, IL (US);
Garrick W Herbst, Bettendorf, IA (US);
Nathan R Vandike, Geneseo, IL (US);
Todd E Van Hal, Eldridge, IA (US)

(73) Assignee: Deere & Company, Moline, IL (US)

( * ) Notice: Subject to any disclaimer, the term of this patent is extended or adjusted under 35 U.S.C. 154(b) by 504 days.

(21) Appl. No.: 13/438,563

(22) Filed: Apr. 3, 2012

(65) Prior Publication Data

US 2013/0255644 A1 Oct. 3, 2013

(51) Int. Cl.
*F02M 15/00* (2006.01)
*F02M 37/04* (2006.01)

(52) U.S. Cl.
USPC ............................................. 123/510; 123/541

(58) Field of Classification Search
CPC ..... F02D 41/3035; F02D 33/006; F02D 1/10; F02D 1/045; F02M 37/106; F02M 37/025; F02M 37/0023; F02M 37/0064
USPC ........ 123/41.01, 41.04, 41.24, 364, 510, 515, 123/516, 540, 541
See application file for complete search history.

(56) References Cited

U.S. PATENT DOCUMENTS

| | | | | |
|---|---|---|---|---|
| 5,170,753 A | * | 12/1992 | Sato | 123/41.09 |
| 6,098,576 A | * | 8/2000 | Nowak et al. | 123/41.33 |
| 6,234,151 B1 | * | 5/2001 | Eck | 123/514 |
| 6,457,460 B1 | * | 10/2002 | Doane et al. | 123/541 |
| 7,216,634 B2 | * | 5/2007 | Hayasaka et al. | 123/514 |
| 2002/0174653 A1 | * | 11/2002 | Uzkan | 60/599 |
| 2003/0005913 A1 | * | 1/2003 | Shelor et al. | 123/541 |
| 2009/0235896 A1 | * | 9/2009 | Gruber et al. | 123/27 R |

* cited by examiner

*Primary Examiner* — John Kwon
*Assistant Examiner* — Johnny H Hoang

(57) ABSTRACT

A diesel fuel feed system comprises a diesel engine (100); a fuel cooler (102); a fuel tank (106); and a makeup valve (104).

18 Claims, 1 Drawing Sheet

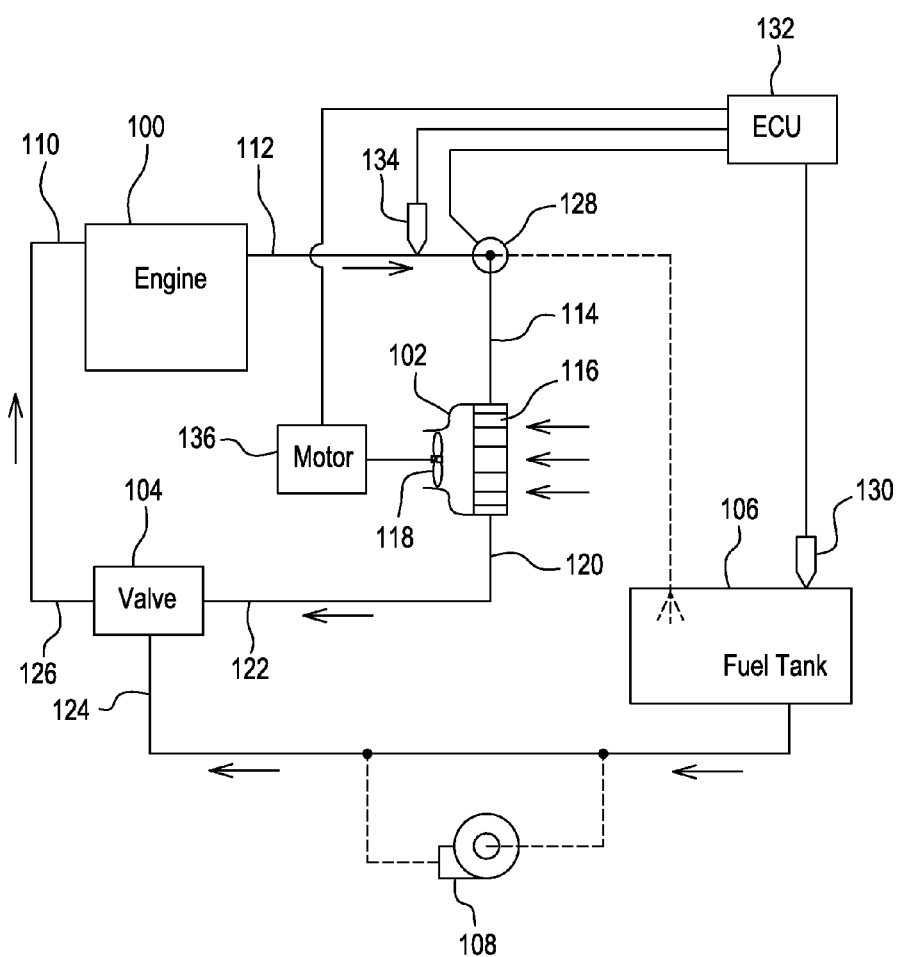

DIESEL FUEL FEED SYSTEM

FIELD OF THE INVENTION

This invention relates to diesel fuel feed system for work vehicles.

BACKGROUND OF THE INVENTION

In a typical diesel fuel supply circuit, a reservoir or tank is provided with diesel fuel that in turn is supplied to the diesel engine. A recirculating diesel fuel circuit is connected between the engine and the fuel tank in which one fuel line extends from the fuel tank to the diesel engine to supply the engine with fuel, and another fuel line extends from the diesel engine back to the fuel tank to return overflow fuel to the tank.

At least one pump is provided in this closed loop circuit to pressurize the diesel fuel and move it from the fuel tank through the engine and back to the tank.

An excess of diesel fuel is usually provided by the pump, such that when the operator places a large demand on the engine, for example by stepping on the accelerator pedal, there will be sufficient diesel fuel supply to the engine to meet any power demand. When the operator does not need as much power, he releases the accelerator pedal, permitting the engine to slow to idle or to some lower power setting in which the engine consumes much less fuel.

The pump, producing an excess of fuel, must be allowed to send the excess fuel somewhere. For this reason, a bypass valve is provided in the fuel circuit that lets this excess fuel from the pump bypass the engine and go back to the fuel tank.

The process of pressurizing the fuel and routing it through the engine compartment causes the diesel fuel to heat substantially. The temperature may be as high as 100 or 110° C. This heat must be removed before the fuel was returned to the fuel tank. For this reason, a fuel cooler is typically provided in the return path of the fuel from the engine to the fuel tank.

In a new arrangement, however, vehicles have been provided with fuel tanks that are made of a conductive material, such as a light metal alloy, and are disposed in or adjacent to the engine compartment itself where the heat is generated. This has resulted in the fuel tank absorbing a significant amount of heat from the environment.

This additional heat transmitted to the fuel in the fuel tank poses a problem. Fuel that starts from the fuel tank at an elevated temperature (e.g. 70° C.) can damage other engine components.

It is an object of this invention to provide a diesel fuel supply circuit that reduces the temperature of the fuel provided to the engine. This benefit is provided by the invention as recited in claim one. Additional improvements are provided by the modifications described in the other claims.

SUMMARY OF THE INVENTION

In accordance with one aspect of the invention, a fuel system for diesel engine is provided comprising a fuel cooler, a fuel tank, and a makeup valve. The fuel cooler has a fuel inlet and fuel outlet. The fuel inlet is coupled to a fuel outlet of the engine to receive excess fuel therefrom.

The fuel cooler has a fuel inlet and a fuel outlet. The fuel outlet is connected to a fuel inlet of the makeup valve to receive fuel cooled by the fuel cooler.

The makeup valve has two fuel inlets and a fuel outlet. The fuel inlet is connected to the fuel tank to receive fuel therefrom.

Recirculated fuel from the fuel cooler and makeup fuel received from the fuel tank are combined at the makeup valve and are transmitted to the engine.

The engine is an internal combustion engine and has a fuel inlet and the fuel outlet. The engine is configured to receive a portion of the fuel from the fuel inlet and combusted in the cylinders, and to communicate an excess part of the fuel to the fuel outlet of the engine and hence (as explained above) to the fuel inlet of the fuel cooler.

If the fuel tank is located high enough in the vehicle, gravity will feed fuel from the fuel tank to the makeup valve. In other arrangements, however, it may be necessary to provide a pump in a fuel conduit that connects the outlet of the fuel tank to the inlet of the makeup valve.

In another alternative arrangement, the fuel cooler may have a fuel outlet that does not feed the makeup valve directly, but is connected to a diversion valve that has two fuel outlets, a first to fuel outlet that is coupled to the valve, and a second fuel outlet that is coupled to the fuel tank. When the diversion valve is activated, fuel leaving the fuel cooler is conducted to the fuel tank, and not to the valve.

In accordance with another aspect of the invention, a diesel fuel feed system comprises a diesel engine having a fuel inlet and a fuel outlet, the fuel inlet of the diesel engine being configured to receive diesel fuel for combustion in the diesel engine, and the fuel outlet of the diesel engine being configured to convey fuel in excess of fuel combusted in the engine away from the engine for reuse, a fuel cooler having a fuel inlet and a fuel outlet, the fuel inlet of the fuel cooler being coupled to the fuel outlet of the diesel engine to receive the excess fuel from the engine, to cool the excess fuel, and to convey the cooled fuel to the fuel outlet of the fuel cooler, a fuel tank having a fuel inlet and a fuel outlet, the fuel outlet of the tank being configured to supply fuel from the tank to the diesel engine, and a makeup valve having a first fuel inlet, a second fuel inlet and a fuel outlet, wherein the first fuel inlet of the makeup valve is coupled to the fuel outlet of the fuel cooler to receive substantially all of fuel therefrom, wherein the second fuel inlet of the makeup valve is coupled to the fuel outlet of the fuel tank to receive substantially all fuel therefrom, and wherein the fuel outlet of the makeup valve is coupled to the fuel inlet of the engine to provide the engine with substantially all fuel thereto.

A pump may be disposed in line between the fuel outlet of fuel tank and the second fuel inlet of the makeup valve. A bypass valve may be disposed in line between the fuel inlet of the cooler and the fuel outlet of the engine to receive substantially all the excess fuel from the engine, and the bypass valve may include a fuel outlet that is coupled to the fuel inlet of the fuel tank thereby conducting some of the excess fuel to the fuel tank and thereby bypassing the fuel cooler. The bypass valve may be thermally operated based upon heat conducted to the bypass valve from the excess fuel leaving the engine. A temperature sensor may be disposed to sense the temperature of fuel at the fuel tank or of excess fuel leaving the engine. An electronic control unit (ECU) 132 may be coupled to the temperature sensor and configured to control the flow of fluid into the fuel cooler based upon a signal from the temperature sensor. The electronic control unit may be configured to selectively direct the flow of excess fuel from the engine to one of the fuel cooler and the fuel tank based upon the signal from the temperature sensor. An electronic control unit (ECU) may be coupled to the temperature sensor and configured to control a flow of secondary cooling fluid through the fuel cooler based upon a signal from the temperature sensor. A motor may be coupled to a fan to draw the flow of secondary cooling fluid through the fuel cooler, and further wherein the motor is coupled to the ECU to control the flow of secondary cooling fluid through the fuel cooler.

BRIEF DESCRIPTION OF THE DRAWINGS

FIG. 1 is a schematic diagram of the diesel fuel feed system in accordance with the present invention.

DETAILED DESCRIPTION

FIG. 1 shows a diesel fuel feed system for a work vehicle. This arrangement includes engine 100, engine oil cooler 102, make up valve 104, fuel tank 106, and pump 108.

Engine 100 has a fuel inlet 110 and a fuel outlet 112. Low pressure fuel is provided to the engine through fuel inlet 110. Inside the engine, a high pressure fuel pump is provided that pressurized the fuel to several thousand pounds per square inch. This pressurized fuel is provided to several fuel injectors which inject fuel into the engine cylinders. A pressure relief or bypass valve is provided in the engine to conduct some of this fuel around the injectors and provide it to fuel outlet 112. This overflow or bypass fuel is then reused. The overflow fuel is provided at a much lower pressure than the pressurized fuel provided to the fuel injectors.

During the process of pressurizing the fuel and routing it around and through the engine, the fuel, including the bypass fuel, is heated substantially. For the combusted fuel this is not a problem. For the bypass fuel it is a problem. Thus, the fuel leaving the engine must be cooled down (typically at or below 60° C.) before it can again be sent back to the engine, raised to a high pressure, and routed to the injectors.

To cool fuel down, a fuel cooler 102 is provided. The fuel cooler has a fuel inlet 114 which is connected to the fuel outlet 112 of engine 100 to receive fuel therefrom. In a typical range meant, shown here, fuel cooler 100 and to is an air cooler. It has a cooling element 116 through which fuel passes. Cooling air is transmitted through the cooling element 116, impelled by a fan 118. Once cooled, the cooled fuel leaves fuel cooler 100 and to through a fuel outlet 120.

A makeup valve 104 is provided to receive fuel from the fuel cooler 100 at a fuel inlet 122 and also from the fuel tank 106 and a fuel inlet 124. The fuel received from fuel tank 106 is makeup fuel, which is added to the bypass fuel received from fuel cooler 102. These two fuel inputs are combined by makeup valve 104 and are transmitted to the fuel outlet 126 of makeup valve 104.

The fuel outlet 126 of makeup valve 104 is connected to the fuel inlet 110 of engine 100.

In an alternative arrangement, a pump 108 may be provided to pressurize the fuel in fuel tank 106 sufficient to ensure a net positive pressure of fuel provided to the fuel inlet 110 of engine 100 under all operating conditions.

In another alternative arrangement, a bypass valve 128 may be provided in the fuel conduit that connects the fuel outlet 112 of engine 100 to the fuel inlet 114 of fuel cooler 102. This bypass valve 128 is configured to selectively switch the flow of fuel from the fuel outlet 112 of engine 100 to tank 106 and not to the fuel inlet 114 of fuel cooler 102. This is particularly beneficial when the engine is started in cold weather. Any heat produced by the engine can be conveyed to the fuel tank 106 two preheat the fuel in the fuel tank when the vehicle is started.

To provide this capability, a bypass valve 128 is configured to selectively direct fuel flow from the engine to either cooler 102 or fuel tank 106. In one arrangement, a fuel temperature sensor 130 is disposed to indicate the temperature of the fuel in fuel tank 106. Temperature sensor 130 communicates this symbol the ECU 132. ECU 132 is programmed to receive this temperature signal, and if the temperature of the fuel in the fuel tank is below a predetermined threshold temperature, to signal bypass valve 128 to stop sending fuel to cooler 102 and instead to send fuel to fuel tank 106.

Alternatively, the bypass valve 128 may be a mechanically operated thermostatic valve that is responsive to the temperature of the fuel leaving the engine and passing through the bypass valve 128, wherein the thermally operated thermostatic valve is configured to prevent fluid from flowing into fuel cooler 102 and direct it into fuel tank 106 when the fuel temperature of the fuel leaving the engine 100 is below a predetermined threshold temperature (which would be the case if the vehicle is just being started and the fuel in the fuel tank is cold, and the engine is cold).

Alternatively, instead of bypass valve 128 being a mechanically operated thermostatic valve, 128, ECU 132 could be programmed to respond to the temperature of the fuel leaving the engine as indicated by temperature sensor 134 and responsively signal valve 128 to direct fuel toward fuel tank 106 and not into cooler 102 until the temperature of the fuel leaving the engine was greater than a predetermined threshold.

As yet another alternative, a motor 136 may be provided to drive a fan pulling air through fuel cooler 102. The ECU 132 can be configured to turn off motor 136 and thus reduce cooling when the temperature of the fuel in fuel tank 106 as indicated by temperature sensor 130, or the temperature of fuel leaving the engine 100 as indicated by temperature sensor 134 falls below a predetermined threshold temperature.

In any of the above alternative embodiments, the sensors 130, 134, ECU 132, and valve 128 would also be configured automatically change their settings to return flow through the fuel cooler 102 (or turn on motor 136 in the last alternative arrangement) when any of the sensed temperatures described above exceeds a predetermined threshold temperature.

The invention claimed is:

1. A diesel fuel feed system comprising:
   a diesel engine (100) having a fuel inlet and a fuel outlet, the fuel inlet of the diesel engine (100) being configured to receive diesel fuel for combustion in the diesel engine (100), and the fuel outlet of the diesel engine (100) being configured to convey fuel in excess of fuel combusted in the engine (100) away from the engine (100) for reuse;
   a fuel cooler (102) having a fuel inlet and a fuel outlet, the fuel inlet of the fuel cooler (102) being coupled to the fuel outlet of the diesel engine (100) to receive the excess fuel from the engine (100), to cool the excess fuel, and to convey the cooled fuel to the fuel outlet of the fuel cooler (102);
   a fuel tank (106) having a fuel inlet and a fuel outlet, the fuel outlet of the tank (106) being configured to supply fuel from the tank (106) to the diesel engine (100); and
   a makeup valve (104) having a first fuel inlet, a second fuel inlet and a fuel outlet, wherein the first fuel inlet of the makeup valve (104) is coupled to the fuel outlet of the fuel cooler (102) to receive substantially all of fuel therefrom, wherein the second fuel inlet of the makeup valve (104) is coupled to the fuel outlet of the fuel tank (106) to receive substantially all fuel therefrom, and wherein the fuel outlet of the makeup valve (104) is coupled to the fuel inlet of the engine (100) to provide the engine (100) with substantially all fuel thereto.

2. The diesel fuel feed system of claim 1, wherein a pump is disposed in line between the fuel outlet of fuel tank (106) and the second fuel inlet of the makeup valve (104).

3. The diesel fuel feed system of claim 1, wherein a bypass valve (128) is disposed in line between the fuel inlet of the cooler (102) and the fuel outlet of the engine (100) to receive substantially all the excess fuel from the engine (100), and further wherein the bypass valve (128) includes a fuel outlet that is coupled to the fuel inlet of the fuel tank (106) thereby conducting some of the excess fuel to the fuel tank (106) and thereby bypassing the fuel cooler (102).

4. The diesel fuel feed system of claim 3, wherein the bypass valve (128) is thermally operated based upon heat conducted to the bypass valve (128) from the excess fuel leaving the engine (100).

5. The diesel fuel feed system of claim 3, further comprising a temperature sensor disposed to sense the temperature of fuel at the fuel tank (106) or of excess fuel leaving the engine (100).

6. The diesel fuel feed system of claim 5, further comprising an electronic control unit (ECU) 132 coupled to the temperature sensor and configured to control the flow of fluid into the fuel cooler (102) based upon a signal from the temperature sensor.

7. The diesel fuel feed system of claim 6, wherein the electronic control unit is configured to selectively direct the flow of excess fuel from the engine (100) to one of the fuel cooler (102) and the fuel tank (106) based upon the signal from the temperature sensor.

8. The diesel fuel feed system of claim 3, further comprising an electronic control unit (ECU) coupled to the temperature sensor and configured to control a flow of secondary cooling fluid through the fuel cooler (102) based upon a signal from the temperature sensor.

9. The diesel fuel feed system of claim 8, further comprising a motor (136) coupled to a fan (118) to draw the flow of secondary cooling fluid through the fuel cooler (102), and further wherein the motor (136) is coupled to the ECU (132) to control the flow of secondary cooling fluid through the fuel cooler (102).

10. A diesel fuel feed system for diesel engine (100), the diesel engine (100) having a fuel inlet and a fuel outlet, the fuel inlet being configured to receive diesel fuel for combustion in the diesel engine (100), and the fuel outlet being configured to convey fuel in excess of fuel combusted in the engine (100) away from the engine (100) for reuse, the system comprising:
  a fuel cooler (102) having a fuel inlet and a fuel outlet, the fuel inlet of the fuel cooler (102) being coupled to the fuel outlet of the diesel engine (100) to receive the excess fuel from the engine (100), to cool the excess fuel, and to convey the cooled fuel to the fuel outlet of the fuel cooler (102);
  a fuel tank (106) having a fuel inlet and a fuel outlet, the fuel outlet of the fuel tank (106) being configured to supply fuel from the tank (106) to the diesel engine (100); and
  a makeup valve (104) having a first fuel inlet, a second fuel inlet and a fuel outlet, wherein the first fuel inlet of the makeup valve (104) is coupled to the fuel outlet of the fuel cooler (102) to receive substantially all the fuel therefrom, wherein the second fuel inlet of the makeup valve (104) is coupled to the fuel outlet of the fuel tank (106) to receive substantially all fuel therefrom, and wherein the fuel outlet of the makeup valve (104) is coupled to the fuel inlet of the engine (100) to provide the engine (100) with substantially all fuel thereto.

11. The diesel fuel feed system of claim 10, wherein a pump is disposed in line between the fuel outlet of fuel tank (106) and the second fuel inlet of the makeup valve (104).

12. The diesel fuel feed system of claim 10, wherein a bypass valve (128) is disposed in line between the fuel inlet of the fuel cooler (102) and the fuel outlet of the engine (100) to receive substantially all the excess fuel from the engine (100), and further wherein the bypass valve (128) includes a fuel outlet that is coupled to the fuel inlet of the fuel tank (106) thereby conducting some of the excess fuel to the fuel tank (106) thereby bypassing the fuel cooler (102).

13. The diesel fuel feed system of claim 12, wherein the bypass valve (128) is thermally operated based upon heat conducted to the bypass valve (128) from the excess fuel leaving the engine (100).

14. The diesel fuel feed system of claim 12, further comprising a temperature sensor disposed to sense the temperature of fuel at the fuel tank (106) or excess fuel leaving the engine (100).

15. The diesel fuel feed system of claim 14, further comprising an electronic control unit (ECU) (132) coupled to the temperature sensor and configured to control the flow of fluid into the fuel cooler (102) based upon a signal from the temperature sensor.

16. The diesel fuel feed system of claim 15, wherein the electronic control unit is configured to selectively direct the flow of excess fuel from the engine (100) to one of the fuel cooler (102) and the fuel tank (106) based upon the signal from the temperature sensor.

17. The diesel fuel feed system of claim 12, further comprising an electronic control unit (ECU) (132) coupled to the temperature sensor and configured to control the flow of secondary cooling fluid through the fuel cooler (102) based upon a signal from the temperature sensor.

18. The diesel fuel feed system of claim 17, further comprising a motor (136) coupled to a fan (118) to draw the flow of secondary cooling fluid through the fuel cooler (102), and further wherein the motor (136) is coupled to the ECU (132) to control the flow of secondary cooling fluid through the fuel cooler (102).

* * * * *